(12) United States Patent
Tertinek

(10) Patent No.: US 12,481,052 B2
(45) Date of Patent: Nov. 25, 2025

(54) LOCALIZATION WITH REDUCED POWER CONSUMPTION

(71) Applicant: NXP B.V., Eindhoven (NL)

(72) Inventor: Stefan Tertinek, Graz (AT)

(73) Assignee: NXP B.V., Eindhoven (NL)

( * ) Notice: Subject to any disclaimer, the term of this patent is extended or adjusted under 35 U.S.C. 154(b) by 524 days.

(21) Appl. No.: 17/809,424

(22) Filed: Jun. 28, 2022

(65) Prior Publication Data

US 2023/0013034 A1    Jan. 19, 2023

(30) Foreign Application Priority Data

Jul. 6, 2021    (EP) .................................... 21184118

(51) Int. Cl.
| | |
|---|---|
| *G01S 13/86* | (2006.01) |
| *G01S 13/02* | (2006.01) |
| *H04B 1/69* | (2011.01) |
| *H04W 52/02* | (2009.01) |

(52) U.S. Cl.
CPC .......... *G01S 13/86* (2013.01); *G01S 13/0209* (2013.01); *H04B 1/69* (2013.01); *H04W 52/0225* (2013.01)

(58) Field of Classification Search
None
See application file for complete search history.

(56) References Cited

U.S. PATENT DOCUMENTS

| | | | |
|---|---|---|---|
| 6,420,996 | B1 | 7/2002 | Stopczynski et al. |
| 10,328,899 | B2 * | 6/2019 | Golsch ................. G01S 13/765 |
| 10,559,149 | B1 | 2/2020 | Kuechler |
| 2012/0268308 | A1 | 10/2012 | Tuttle |
| 2014/0330449 | A1 * | 11/2014 | Oman .................. B60R 25/245 |
| | | | 701/2 |
| 2016/0033637 | A1 * | 2/2016 | Leong ...................... G01S 7/34 |
| | | | 375/148 |
| 2017/0176575 | A1 * | 6/2017 | Smits ..................... G01S 7/4808 |
| 2019/0066422 | A1 * | 2/2019 | Breer ........................ H04W 4/20 |
| 2022/0271793 | A1 | 8/2022 | Tertinek et al. |
| 2022/0301371 | A1 | 9/2022 | Tertinek |

FOREIGN PATENT DOCUMENTS

| | | |
|---|---|---|
| EP | 3579018 A1 | 12/2019 |
| WO | 2020201803 A1 | 2/2020 |

OTHER PUBLICATIONS

Chang, S., "Human Detection and Tracking via Ultra-Wideband (UWB) Radar", 2010 IEEE International Conference on Robotics and Automation, May 3-8, 2010.

* cited by examiner

*Primary Examiner* — Marcus E Windrich

(57) ABSTRACT

In accordance with a first aspect of the present disclosure, a system is provided for facilitating localizing an external device, the system comprising: at least one UWB communication node; a controller operatively coupled to said UWB communication node, wherein the controller is configured to switch the UWB communication node between a ranging mode of operation and a radar mode of operation in dependence on an estimated distance between the UWB communication node and the external device.

12 Claims, 8 Drawing Sheets

LOCALIZATION WITH REDUCED POWER CONSUMPTION

CROSS-REFERENCE TO RELATED APPLICATIONS

This application claims the priority under 35 U.S.C. § 119 of European Patent application no. 21184118.4, filed on Jul. 6, 2021, the contents of which are incorporated by reference herein.

TECHNICAL FIELD

The present disclosure relates to a system for facilitating localizing an external device. Furthermore, the present disclosure relates to a corresponding method for facilitating localizing an external device, and to a computer program for carrying out said method. In addition, the present disclosure relates to a device for facilitating access to an external object. Furthermore, the present disclosure relates to a corresponding method for facilitating access to an external object, and to a corresponding computer program.

BACKGROUND

Ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications.

SUMMARY

In accordance with a first aspect of the present disclosure, a system is provided for facilitating localizing an external device, the system comprising: at least one UWB communication node; a controller operatively coupled to said UWB communication node, wherein the controller is configured to switch the UWB communication node between a ranging mode of operation and a radar mode of operation in dependence on an estimated distance between the UWB communication node and the external device.

In one or more embodiments, the controller is configured to: cause said UWB communication node to operate in the ranging mode if said estimated distance is higher than a first threshold; cause said UWB communication node to operate in a radar mode if said estimated distance is equal to or less than the first threshold and higher than a second threshold; cause said UWB communication node to operate in the ranging mode if said estimated distance is equal to or less than the second threshold.

In one or more embodiments, the first threshold has a value within the range of 15 to 30 meters.

In one or more embodiments, the second threshold has a value within the range of 3 to 5 meters.

In one or more embodiments, the controller is further configured to initiate a transmission of a mode signal to the external device, wherein said mode signal indicates either that a UWB communication unit comprised in the external device is to be operated in the ranging mode or that said UWB communication unit is permitted to enter into a power-down or low-power state.

In one or more embodiments, the mode signal indicates that said UWB communication unit is permitted to enter into the power-down or low-power state when the UWB communication node is switched to operate in the radar mode.

In one or more embodiments, the system further comprises an out-of-band communication unit configured to transmit the mode signal to the external device.

In one or more embodiments, the out-of-band communication unit is a Bluetooth communication unit or a Bluetooth low energy communication unit.

In one or more embodiments, the external device is a device for accessing a vehicle, and the UWB communication nodes are UWB anchors comprised in or attached to said vehicle.

In one or more embodiments, the device for accessing the vehicle is a key fob or a mobile device.

In accordance with a second aspect of the present disclosure, a method is conceived for facilitating localizing an external device, the method comprising: operating at least one UWB communication node either in a ranging mode of operation or in a radar mode of operation; switching, by a controller, the UWB communication node between the ranging mode of operation and the radar mode of operation in dependence on an estimated distance between the UWB communication node and the external device.

In accordance with a third aspect of the present disclosure, a computer program is provided, comprising executable instructions which, when executed by a controller, cause said controller to carry out a method of the kind set forth.

In accordance with a fourth aspect of the present disclosure, a device is provided for facilitating access to an external object, comprising: a UWB communication unit; a controller operatively coupled to said UWB communication unit, wherein the controller is configured to switch the UWB communication unit between a ranging mode of operation and a power-down or low-power state in response to a mode signal received from the external object.

In accordance with a fifth aspect of the present disclosure, a method is conceived for facilitating access to an external object, comprising: operating a UWB communication unit in a ranging mode of operation, wherein the UWB communication unit is comprised in a device for facilitating said access; switching, by a controller, the UWB communication unit between the ranging mode of operation and a power-down or low-power state in response to a mode signal received from the external object.

In accordance with a sixth aspect of the present disclosure, a computer program is provided, comprising executable instructions which, when executed by a controller, cause said controller to carry out a method of the kind set forth.

DESCRIPTION OF DRAWINGS

Embodiments will be described in more detail with reference to the appended drawings, in which.

DESCRIPTION OF EMBODIMENTS

As mentioned above, UWB is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications.

Accordingly, smart vehicle access systems may employ UWB technology to enable access to a vehicle or another object, in particular by facilitating ranging operations between an access device (e.g. a key fob or a mobile device) and one or more UWB anchors in the vehicle or other object. However, a localization process which is based on ranging operations typically increases the power consumption of the access device. This may not be desirable, because the power source (e.g., battery) of the access device will have to be replaced too often, or the access device will have to contain a larger power source, which in turn will increase the size of the access device.

Now are discussed a system and a corresponding method which facilitate the localization of an external device, such as an access device. The external device may be a device that facilitates the access to an external object, such as a vehicle. Said system and method reduce the power consumption of the external device while maintaining an acceptable level of tracking accuracy. Furthermore, a device and corresponding method are discussed for facilitating access to an external object, such as a vehicle. Said device and method reduce the power consumption of the device while maintaining an acceptable level of tracking accuracy.

Figure 1:
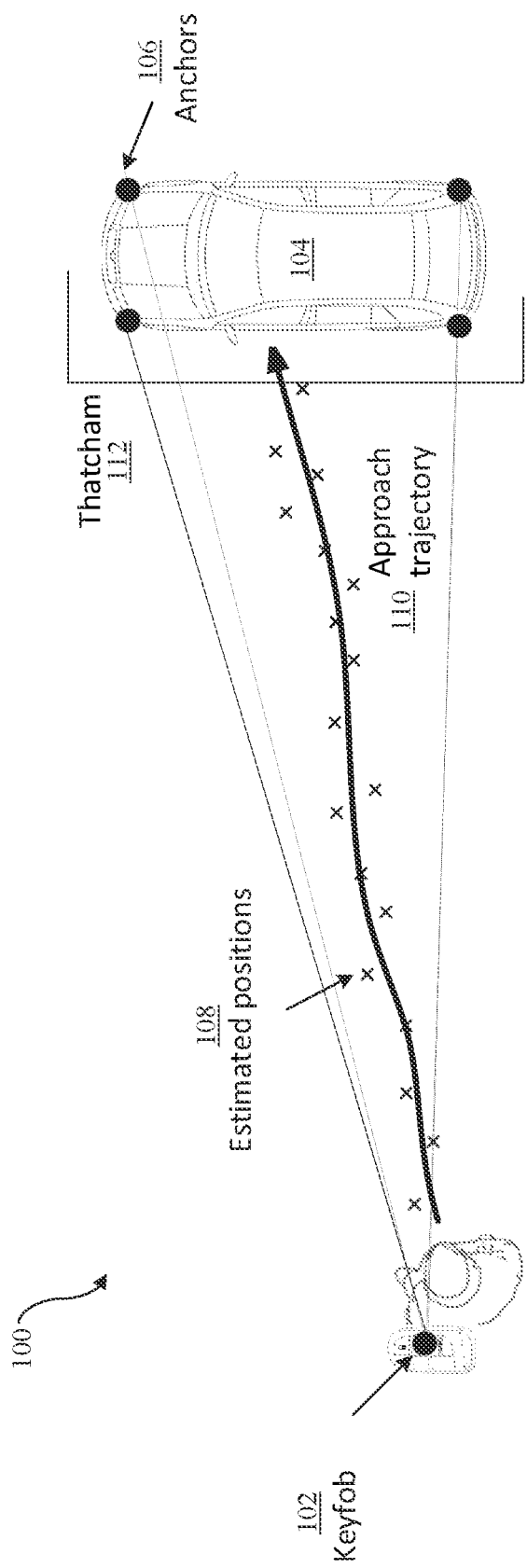
FIG. 1 shows an example of a user tracking system.

FIG. 1 shows an example of a user tracking system 100. In particular, the user tracking system 100 is used to enable access to a vehicle 104. It is noted that the vehicle 104 is only an example of an object that can be accessed. In other words, a user tracking system of the kind set forth might also be used to enable access to another object, such as a building or a given space withing a building. UWB-based smart access systems may provide increased security and an improved user experience by localizing a user relative to an infrastructure to be accessed. During an access procedure it may be necessary to track the user's position and perform an action (such as unlocking a door) when the user is within a certain range. The position tracking may be carried out by continuously exchanging UWB frames between the user's mobile device and the anchors on the side of the infrastructure, and determining the position based on range and/or angle information. In the vehicle access scenario shown in FIG. 1, a vehicle 104 estimates and tracks the user position (i.e., computes an approach trajectory 110) based on range information between a key fob 102 and vehicle anchors 106, unlocking the doors only when the user is within a Thatcham zone 112. The Thatcham zone 112 is a zone which has been defined by the Motor Insurance Repair Research Centre (MIRRC). The Thatcham zone 112 is defined as an operating range around a vehicle, which does not exceed 2 meters from any point around the perimeter of the vehicle. It is noted that this zone or a similar zone might be referred to by another name.

It is noted that a user tracking system 100 of the kind shown in FIG. 1 may significantly increase the power or energy consumption on the side of the key fob 102, thereby reducing the battery life and negatively impacting user experience. For example, the key fob 102 typically comprises a coin cell battery. However, such a coin cell battery may be depleted quickly when a continuous ranging is performed between the key fob 102 and the anchors 106. Consequently, the key fob 102 may soon malfunction and the battery may have to be replaced too often. Alternatively, the key fob 102 would have to be equipped with a more powerful and larger battery, which is also not desirable, because it increases the size and the cost of the key fob 102.

Figure 2:
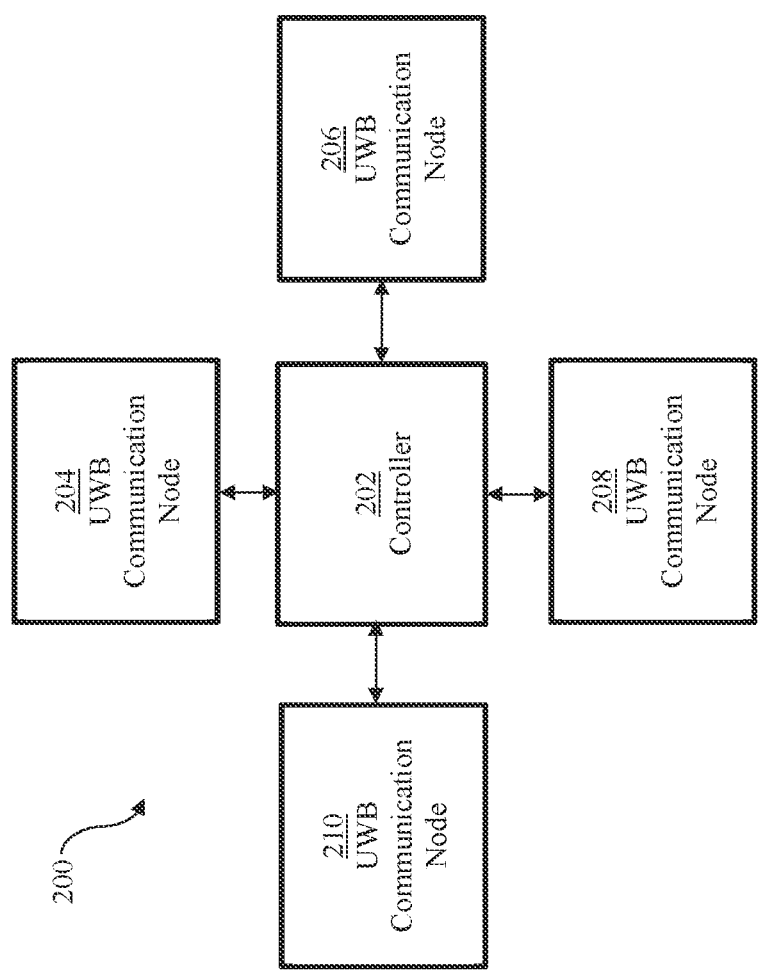
FIG. 2 shows an illustrative embodiment of a system for facilitating localizing an external device.

FIG. 2 shows an illustrative embodiment of a system 200 for facilitating localizing an external device. The system 200 comprises a controller 202 which is operatively coupled to a plurality of UWB communication nodes 204, 206, 208, 210. The UWB communication nodes 204, 206, 208, 210 may be implemented as anchors of the kind set forth above. The controller 202 is configured to switch the UWB communication nodes 204, 206, 208, 210 between a ranging mode of operation and a radar mode of operation in dependence on an estimated distance between the UWB communication nodes 204, 206, 208, 210 and the external device (not shown). In this way, power may be saved on the side of the external device. In particular, when the UWB communication nodes 204, 206, 208, 210 are switched to operate in the radar mode, the external device no longer needs to exchange UWB messages with the UWB communication nodes 204, 206, 208, 210. Accordingly, the external device may enter into a power-down or low-power state. However, the position of the external device may still be tracked by the UWB communication nodes 204, 206, 208, 210 operating in the radar mode, which may result in an acceptable accuracy for a given range of distances between the UWB communication nodes 204, 206, 208, 210 and the external device.

UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The angle-of-arrival (AoA) mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. The AoA mode of operation may facilitate a more accurate determination of the position of an object and may thus complement ranging operations performed in the ranging mode. As used in this description, the ranging mode of operation may therefore be extended to include the AoA mode of operation, in the sense that when a device operates in the ranging mode, it may optionally perform additional operations which are typically performed in the AoA mode of operation.

In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The radar mode of operation may be used to advantage to detect (i.e., sense) the presence of objects or human beings. However, the radar mode of operation may also be used to estimate a distance, although with a lower accuracy than the ranging mode of operation will typically achieve. The skilled person will appreciate that the given examples are non-limiting examples of how the different modes of operation can be implemented. In other words, the modes may be implemented differently, depending on the requirements imposed by the application, for example.

In one or more embodiments, the controller is configured to cause said UWB communication node to operate in the ranging mode if said estimated distance is higher than a first threshold, to cause said UWB communication node to operate in a radar mode if said estimated distance is equal to or less than the first threshold and higher than a second threshold, and to cause said UWB communication node to operate in the ranging mode if said estimated distance is equal to or less than the second threshold. In this way, the power consumption of the external device may be reduced for estimated distance values falling within a predefined range (i.e., between the first and threshold). In this predefined range a lower accuracy of the distance measurements may be acceptable, so that the UWB communication node may operate in the radar mode instead of the ranging mode. It is noted that operating UWB communication node may result in a lower distance measurement accuracy, but it does not require the transmission of messages by the external device, which facilitates reducing the power consumption of said device. In a practical implementation, the first threshold has a value within the range of 15 to 30 meters. Furthermore, in a practical implementation, the second threshold has a value within the range of 3 to 5 meters. It is noted that these values are non-limiting examples of suitable values of the first and second threshold. The skilled person will appreciate that other values may be selected, for example depending on the application requirements.

In one or more embodiments, the controller is further configured to initiate a transmission of a mode signal to the external device, wherein said mode signal indicates either that a UWB communication unit comprised in the external device is to be operated in the ranging mode or that said UWB communication unit is permitted to enter into a power-down or low-power state. In this way, the external device may easily be triggered to enter into the power-down or low-power state when no UWB signals need to be transmitted or received by the external device. More specifically, the mode signal may indicate that said UWB communication unit is permitted to enter into the power-down or low-power state when the UWB communication node is switched to operate in the radar mode. As explained above, the radar mode requires only a unilateral operation, in the sense that the external device no longer needs to exchange UWB messages with the UWB communication nodes of the localization system. Thus, when these UWB communication nodes operate in the radar mode, the external device's UWB communication unit may be powered down or enter into a sleep state, to reduce the power consumption of the external device. In a practical implementation, the system further comprises an out-of-band communication unit configured to transmit the mode signal to the external device. For example, a suitable out-of-band communication unit is a Bluetooth communication unit or a Bluetooth low energy communication unit.

Figure 3:
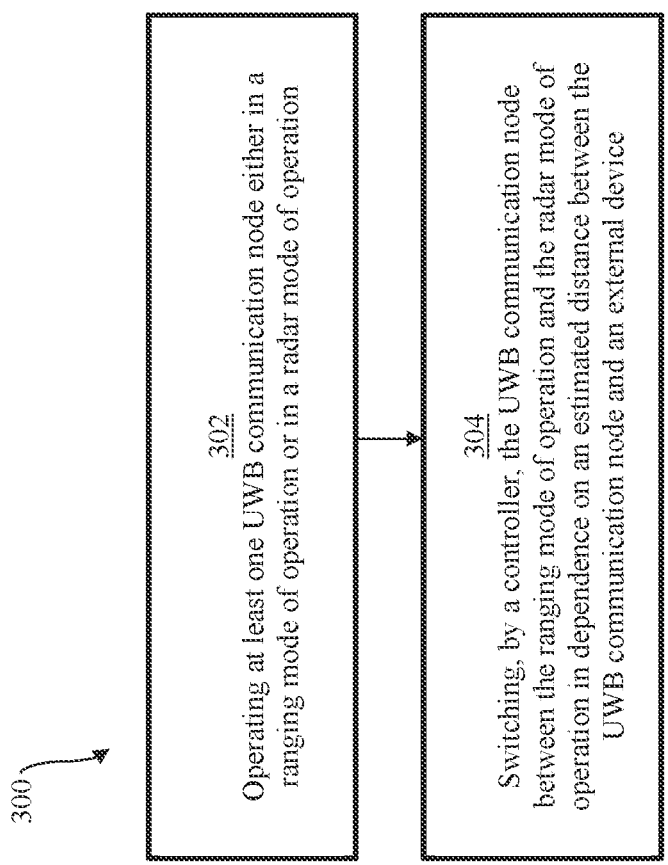
FIG. 3 shows an illustrative embodiment of a method for facilitating localizing an external device.

FIG. 3 shows an illustrative embodiment of a method 300 for facilitating localizing an external device. The method 300 comprises, at 302, operating at least one UWB communication node either in a ranging mode of operation or in a radar mode of operation. Furthermore, the method 300 comprises, at 304, switching, by a controller, the UWB communication node between the ranging mode of operation and the radar mode of operation in dependence on an estimated distance between the UWB communication node and an external device. In this way, power may be saved on the side of the external device, as explained above with reference to the corresponding system shown in FIG. 2.

Figure 4:
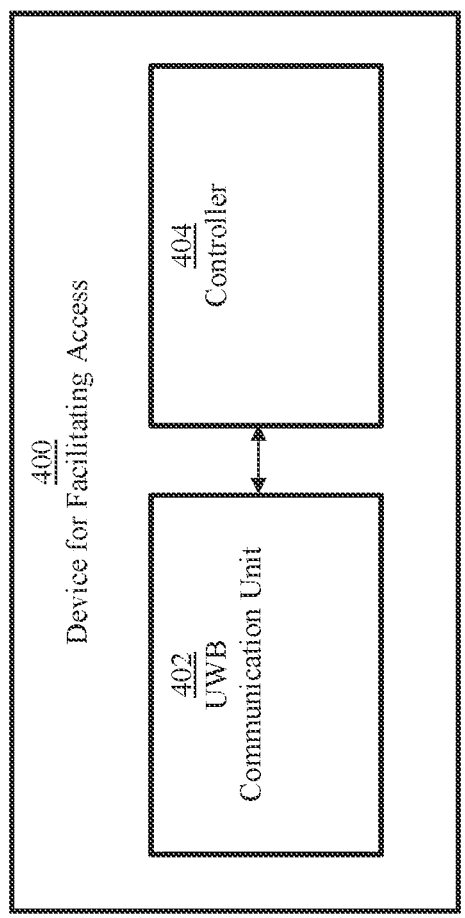
FIG. 4 shows an illustrative embodiment of a device for facilitating access to an external object.

FIG. 4 shows an illustrative embodiment of a device 400 for facilitating access to an external object. The device 400 comprises a UWB communication unit 402 and a controller 404, which are operatively coupled to each other. The controller 404 is configured to switch the UWB communication unit 402 between a ranging mode of operation and a power-down or low-power state in response to a mode signal received from the external object. In this way, the power consumption of the device may be reduced. In particular, the UWB communication unit 402 of the device may be triggered to power down or enter into a sleep state when it no longer needs to exchange messages with the localization system of the external object during the process of tracking the device. Furthermore, the fact that the UWB communication unit 402 no longer needs to exchange said messages may easily be indicated by the mode signal.

Figure 5:
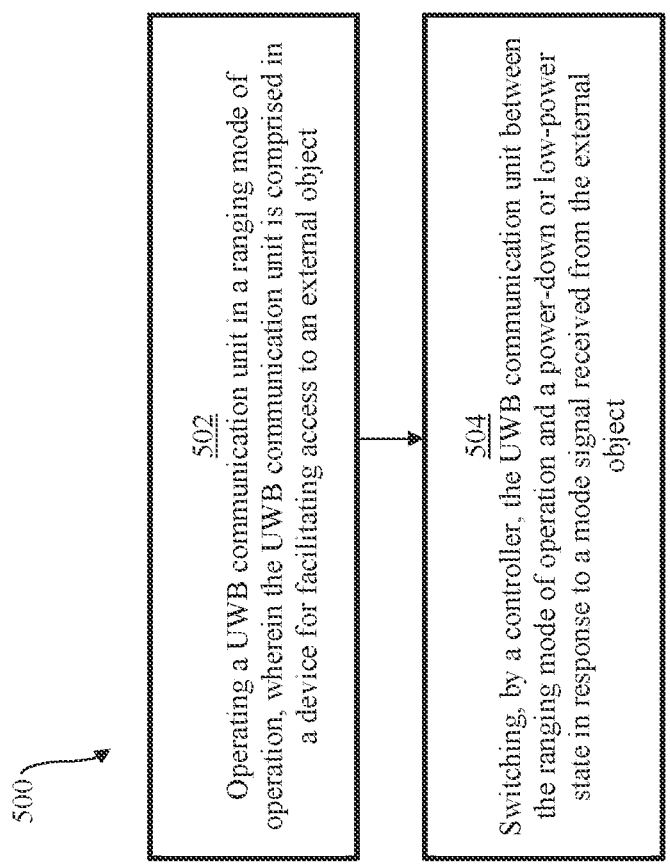
FIG. 5 shows an illustrative embodiment of a method for facilitating access to an external object.

FIG. 5 shows an illustrative embodiment of a method 500 for facilitating access to an external object. The method 500 comprises, at 502, operating a UWB communication unit in a ranging mode of operation, wherein the UWB communication unit is comprised in a device for facilitating access to an external object. Furthermore, the method 500 comprises, at 504, switching, by a controller, the UWB communication unit between the ranging mode of operation and a power-down or low-power state in response to a mode signal received from the external object. In this way, the power consumption of the device may be reduced, as explained with reference to FIG. 4.

Thus, in accordance with the present disclosure, a user may tracked in a ranging mode or in a radar mode, depending on the estimated distance between a user's access device and the localization system comprised in or attached to the object to be accessed (i.e., the localization system of the infrastructure). In the ranging mode, UWB communication may be performed by the access device and by the infrastructure, in particular by the UWB anchors integrated into said infrastructure. In the radar mode, UWB communication may be performed only by the infrastructure, while the UWB component or components of the access device may be turned off. The ranging mode and the radar mode may be selected in dependence on the location of the access device relative to the location of the infrastructure. In particular, the ranging mode may be selected when the access device is far from, or close to, the infrastructure. Furthermore, the radar mode may be selected when the access device is at medium range from the infrastructure. Furthermore, the infrastructure may communicate the selected mode to the access device, for instance through an out-of-band communication channel.

Figure 6:
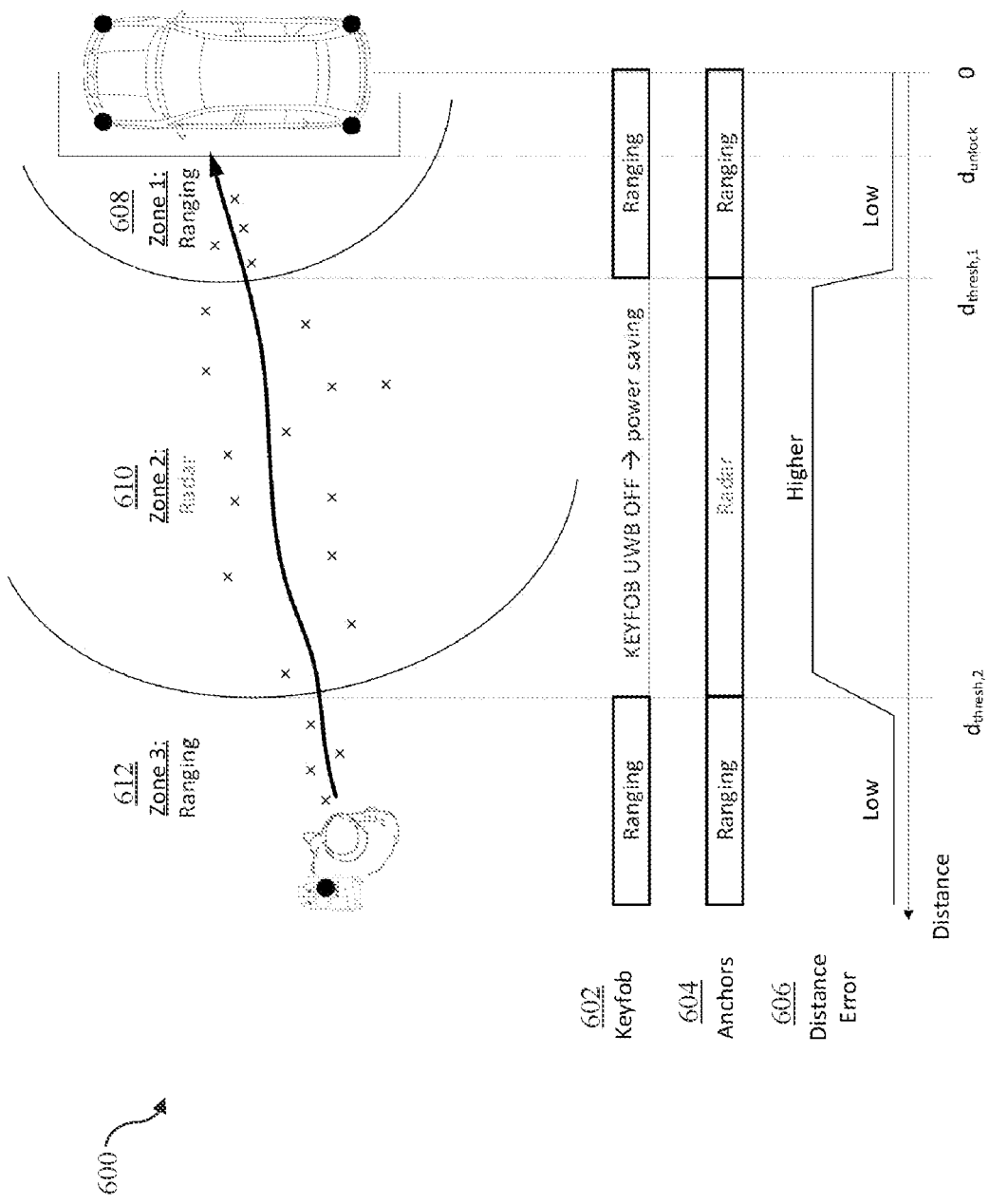
FIG. 6 shows an illustrative embodiment of a system for accessing a vehicle.

FIG. 6 shows an illustrative embodiment of a system 600 for accessing a vehicle. In particular, the system 600 contains a UWB-enabled key fob 602 which is tracked using a plurality of UWB anchors 604 integrated into a vehicle. The tracking mode is changed as the key fob 602 moves through different zones 608, 610, 612, which correspond to ranges of predefined distances around the vehicle. Initially, at a large distance (i.e. in the third zone 612) the key fob 602 establishes wireless connection with the vehicle (e.g., via an out-of-band radio such as Bluetooth) and a UWB ranging session is started with both the key fob 602 and the anchors 604 operating in the ranging mode. In the ranging mode the distance error 606 is low, particularly under line-of-sight conditions. The vehicle starts tracking the location of the user, in particular of the user's key fob 602. Once the vehicle determines that the distance to the key fob 602 is below a threshold dtresh,2 (i.e., that the key fob 602 has moved into the second zone 610), the ranging session is interrupted and the anchors 604 are reconfigured in the UWB radar mode in order track the location of the key fob 602 based on the Doppler effect. In the radar mode the distance error 606 is typically larger than in the ranging mode. However, the UWB chip on the fob side may be turned off, thus saving power. In the second zone 610, the tracking of the key fob 602 is only carried out using the radar mode. Finally, once the vehicle determines that the distance to the user is below a threshold dtresh,1<dtresh,2 (i.e., that the key fob 602 has moved into the first zone 608), while still being larger than a security-critical distance (e.g., a perimeter of 2 meters corresponding to Thatcham zone), the vehicle communicates to the key fob 602 via the out-of-band radio to resume the UWB ranging session. Thus, an accurate and secure user tracking may be continued until for example the Thatcham zone is reached and the vehicle is unlocked. In the radar mode, the slightly increased current consumption is acceptable on the vehicle side, as will be appreciated by the skilled person. Typically, the current is increased from 120 mA (ranging mode) to 180 mA (radar mode), and additional current may be consumed by the digital components executing the radar-based tracking algorithms. However, the power which is saved on the side of the key fob 602 has the effect that the battery lifetime may be increased and/or that the size of the battery may be reduced.

Figure 7:
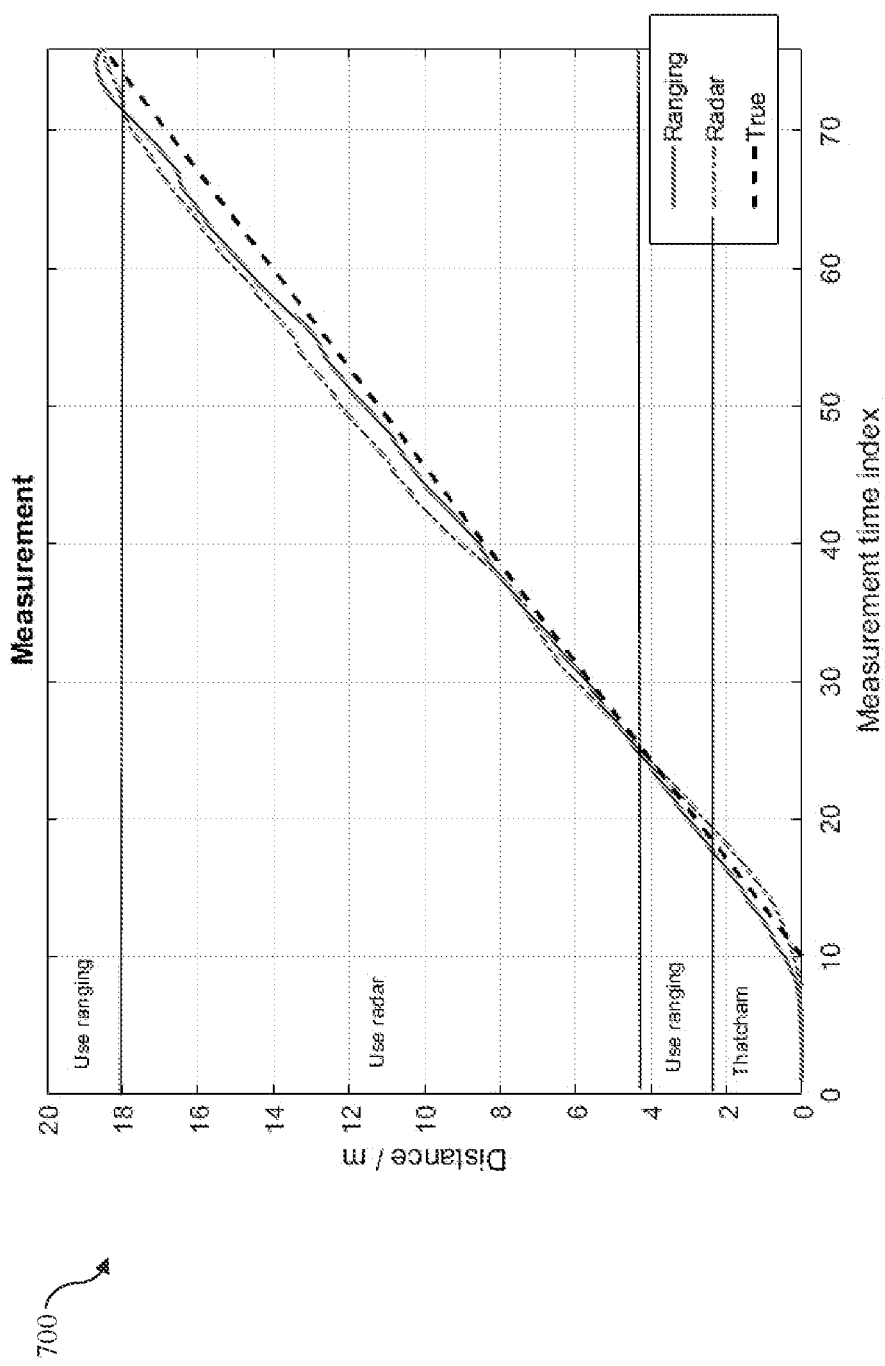
FIG. 7 shows distance measurement results.

FIG. 7 shows distance measurement results 700 which may be obtained in accordance with the present disclosure. In particular, the measurement results are obtained by operating one UWB anchor on the vehicle side and one UWB initiator on the user side. The user is walking away from a vehicle at a constant walking speed over a range of approximately 20 meters. The user location is tracked either in the ranging mode by a continuous UWB frame exchange and logging of the distance, or in the radar mode by a continuous UWB radar frame transmission and reception and position determination based on range and velocity (in the Doppler domain). As shown in FIG. 7, the mode is selected in dependence on the estimated distance (i.e., the measured distance) between the UWB anchor and the UWB initiator. The start of the distance measurements occurs at time index 10. FIG. 7 also shows the true distance at each measurement point. For a vehicle access scenario, the user would be approaching the vehicle, and a threshold could be set for example at 18 meters and at 4 meters to switch between the two modes of operation.

Figure 8:
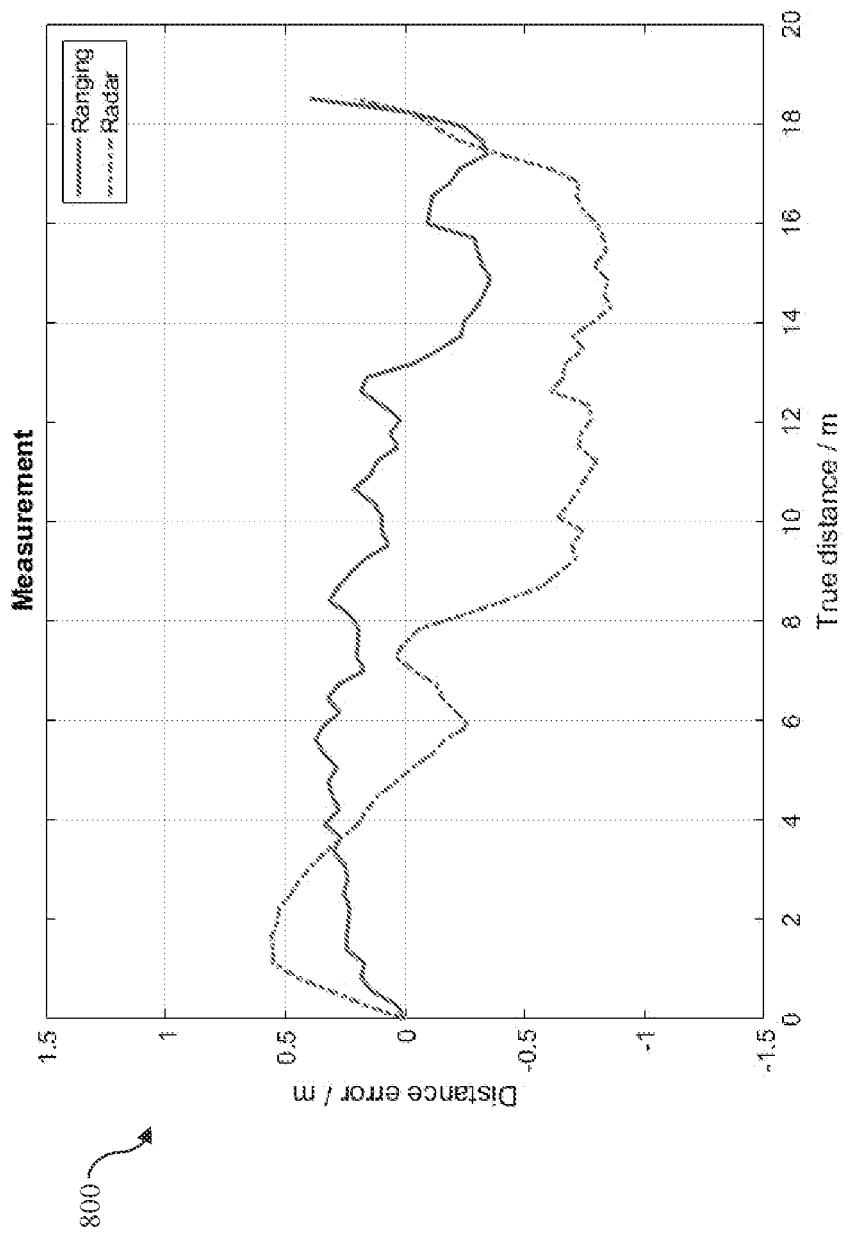
FIG. 8 shows a distance error.

FIG. 8 shows a distance error 800 computed using the measurement results shown in FIG. 7. In particular, it is shown that the operation in the radar mode results in a distance error which is slightly higher than the distance error resulting from the operation in the ranging mode.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 user tracking system
102 key fob
104 vehicle
106 anchors
108 estimated positions
110 approach trajectory
112 Thatcham zone
200 system for facilitating localizing an external device
202 controller
204 UWB communication node
206 UWB communication node
208 UWB communication node
210 UWB communication node
300 method for facilitating localizing an external device
302 operating at least one UWB communication node either in a ranging mode of operation or in a radar mode of operation
304 switching, by a controller, the UWB communication node between the ranging mode of operation and the radar mode of operation in dependence on an estimated distance between the UWB communication node and an external device
400 device for facilitating access to an external object
402 UWB communication unit
404 controller
500 method for facilitating access to an external object
502 operating a UWB communication unit in a ranging mode of operation, wherein the UWB communication unit is comprised in a device for facilitating access to an external object
504 switching, by a controller, the UWB communication unit between the ranging mode of operation and a power-down or low-power state in response to a mode signal received from the external object
600 system for accessing a vehicle
602 key fob
604 anchors
606 distance error
608 first zone (ranging)
610 second zone (radar)
612 third zone (ranging)
700 distance measurement results
800 distance error

The invention claimed is:

1. A system for facilitating localizing an external device, the system comprising:
at least one ultra-wideband, UWB, communication node;
a controller operatively coupled to said UWB communication node, wherein the controller is configured to switch the UWB communication node between a ranging mode of operation and a radar mode of operation in dependence on an estimated distance between the UWB communication node and the external device;
wherein the controller is configured to:
cause said UWB communication node to operate in the ranging mode if said estimated distance is higher than a first threshold;
cause said UWB communication node to operate in a radar mode if said estimated distance is equal to or less than the first threshold and higher than a second threshold;
cause said UWB communication node to operate in the ranging mode if said estimated distance is equal to or less than the second threshold.

2. The system of claim 1, wherein the first threshold has a value within the range of 15 to 30 meters.

3. The system of claim 1, wherein the second threshold has a value within the range of 3 to 5 meters.

4. The system of claim 1, wherein the controller is further configured to initiate a transmission of a mode signal to the external device, wherein said mode signal indicates either that a UWB communication unit comprised in the external device is to be operated in the ranging mode or that said UWB communication unit is permitted to enter into a power-down or low-power state.

5. The system of claim 4, wherein the mode signal indicates that said UWB communication unit is permitted to enter into the power-down or low-power state when the UWB communication node is switched to operate in the radar mode.

6. The system of claim 4, further comprising an out-of-band communication unit configured to transmit the mode signal to the external device.

7. The system of claim 6, wherein the out-of-band communication unit is a Bluetooth communication unit or a Bluetooth low energy communication unit.

8. The system of claim 1, wherein the external device is a device for accessing a vehicle, and wherein the UWB communication nodes are UWB anchors comprised in or attached to said vehicle.

9. The system of claim 8, wherein the device for accessing the vehicle is a key fob or a mobile device.

10. A method for facilitating localizing an external device, the method comprising:
operating at least one ultra-wideband, UWB, communication node either in a ranging mode of operation or in a radar mode of operation;
switching, by a controller, the UWB communication node between the ranging mode of operation and the radar mode of operation in dependence on an estimated distance between the UWB communication node and the external device;
wherein the controller causes:
said UWB communication node to operate in the ranging mode if said estimated distance is higher than a first threshold;
said UWB communication node to operate in a radar mode if said estimated distance is equal to or less than the first threshold and higher than a second threshold;
said UWB communication node to operate in the ranging mode if said estimated distance is equal to or less than the second threshold.

11. The system of claim 5, wherein the external device is a device for accessing a vehicle, and wherein the UWB communication nodes are UWB anchors comprised in or attached to said vehicle.

12. The system of claim 5, further comprising an out-of-band communication unit configured to transmit the mode signal to the external device.

\* \* \* \* \*